(No Model.)

W. BRISTOW.
WHEEL SPOKE.

No. 451,206. Patented Apr. 28, 1891.

Fig 1  Fig 2

Witnesses:
Edwin F. Hayner
R. J. Allen

Walter Bristow Inventor
By Allen V. Ingalls Attorney

UNITED STATES PATENT OFFICE.

WALTER BRISTOW, OF OTTAWA, CANADA.

WHEEL-SPOKE.

SPECIFICATION forming part of Letters Patent No. 451,206, dated April 28, 1891.

Application filed September 10, 1890. Serial No. 364,580. (No model.)

*To all whom it may concern:*

Be it known that I, WALTER BRISTOW, a citizen of the Dominion of Canada, residing at Ottawa, in the county of Carleton, in the Province of Ontario, Canada, a subject of the Queen of Great Britain, have invented certain new and useful Improvements in Wheel-Spokes, of which the following is a full, clear, and exact description.

Reference is to be had to the accompanying drawings, forming a part of this specification, in which similar letters of reference indicate corresponding parts in all the figures.

Figure 3:
Figure 6:
Figure 4:
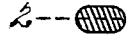
Figure 7:
Figure 5:
Figure 8:

Figure 1 is a plan of a spoke embodying my invention. Fig. 2 is a plan of a spoke embodying my invention in a modified form. Fig. 3 is a sectional view on line 1 1 of the spoke shown in Fig. 1. Fig. 4 is a sectional view on line 2 2 of the spoke shown in Fig. 1. Fig. 5 is a sectional view on line 3 3 of the spoke shown in Fig. 1. Figs. 6, 7, and 8 show views in cross-section of the modified form of the spoke shown in Fig. 2.

The object of my invention is, first, to construct a spoke of metal that will be durable, cheap, and simple, applicable to vehicles of all kinds used on roads or highways—as, for instance, double express or light drawing wagons, horse-carts, two-wheeled vehicles, farming implements, and all carriages or vehicles or devices requiring wheels upon which they move on the ground, and, second, to overcome the defects in all of the spokes now in existence or in use in wheels of the kinds above specified.

It is well understood that there is a great lateral strain on wheels such as above described, caused by the uneven surface of the ground over which they move. This side motion or backward and forward strain is the cause of the breaking of the spokes in wheels either at the shoulder where the spokes enter the hub or at the point where they enter the felly. To overcome these defects I so form a wheel-spoke that a certain springiness to ease the side-thrust of an axle may be represented in the spoke or obtained from the spoke and at the same time prevent any undue strain on the shoulder of the spoke or at the point of intersection with the felly.

My invention consists in the peculiar form of a spoke between its two ends, or in the parts of it which lie between the hub and felly of a wheel when such spoke is set in a complete wheel.

In carrying out my invention I taper the spoke gradually down from a point at or very near where the outside of the hub holds it about two-thirds of its length, thence continuing a short distance of a uniform or even size, and thence gradually increasing the size to near the point where the felly and spoke intersect, thereby leaving the two points of contact with the hub and rim of the wheel, where ordinarily-constructed spokes are weakest and most frangible, larger and therefore stronger than that part of them which lies a short distance from the felly or rim of the wheel and the hub, thus allowing the vibration caused by running over uneven ground to be distributed over only a portion of the spoke and leaving its two ends rigid. By this peculiar form I overcome the defects hereinbefore pointed out and obtain a new and useful result. I prefer to roll these spokes out of steel bars and temper them so that they will keep their form and position in a complete wheel, thereby enabling me to make a wheel which is at once durable, cheap, and simple. It must be clearly borne in mind that I roll these spokes in different sizes and lengths to suit wheels adapted for different classes of vehicles or devices.

Having thus fully described my invention, I claim as new and desire to secure by Letters Patent—

As an article of manufacture, a spoke for a wheel, tapered from a point outside of that part which enters the hub gradually down about one-half of its length, thence on curved lines continuing uniform a short distance, thence on curved lines increasing the size near the point of its intersection with a felly, substantially as and for the purposes hereinbefore set forth.

WALTER BRISTOW.

Witnesses:
ALLEN G. INGALLS,
EDWIN F. HAYNER.